(12) United States Patent
Ray et al.

(10) Patent No.: US 9,292,599 B2
(45) Date of Patent: Mar. 22, 2016

(54) DECISION-TREE BASED QUANTITATIVE AND QUALITATIVE RECORD CLASSIFICATION

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: Wal-Mart Stores, Inc.

( * ) Notice: Subject to any disclaimer, the term of this patent is extended or adjusted under 35 U.S.C. 154(b) by 374 days.

(21) Appl. No.: 13/874,299

(22) Filed: Apr. 30, 2013

(65) Prior Publication Data
US 2014/0324871 A1    Oct. 30, 2014

(51) Int. Cl.
G06F 17/30    (2006.01)

(52) U.S. Cl.
CPC .... *G06F 17/30705* (2013.01); *G06F 17/30604* (2013.01)

(58) Field of Classification Search
None
See application file for complete search history.

(56) References Cited

U.S. PATENT DOCUMENTS

| | | | |
|---|---|---|---|
| 5,787,274 A | 7/1998 | Agrawal | |
| 6,138,115 A | 10/2000 | Agrawal | |
| 6,718,315 B1 | 4/2004 | Meek | |
| 6,789,252 B1 | 9/2004 | Burke | |
| 7,089,226 B1 | 8/2006 | Dumais | |
| 2003/0078900 A1 | 4/2003 | Dool | |
| 2007/0112752 A1 | 5/2007 | Kalthoff | |
| 2007/0282774 A1* | 12/2007 | Bouzas et al. | 706/45 |
| 2012/0047105 A1* | 2/2012 | Saigal et al. | 706/52 |

OTHER PUBLICATIONS

Anderson et al., "Relational Markov models and their application to adaptive web navigation," Proceedings of the eighth ACM SIGKDD international conference on Knowledge discovery and data mining, ACM, 2002.*

* cited by examiner

*Primary Examiner* — Jay Morrison
(74) *Attorney, Agent, or Firm* — Bryan Cave LLP

(57) ABSTRACT

Systems and methods are disclosed for classifying records by sorting records based on both quantitative and qualitative information at a node in a decision tree. Technologies are also disclosed for determining whether records are linked together by applying quantitative and qualitative information at the same nodes in a decision tree. Furthermore, improvements to decision trees are disclosed in terms of the generation and/or training of decision trees that harnesses additional information in the quantitative and qualitative aspects that a unit of data relevant to a single node, and/or the relationships between these aspects, may provide a machine learning algorithm.

16 Claims, 9 Drawing Sheets

DECISION-TREE BASED QUANTITATIVE AND QUALITATIVE RECORD CLASSIFICATION

BACKGROUND

1. Field of the Invention

This invention relates to the classification of data records within a data store and more particularly to systems and methods for classifying data records by applying a record or record pair to a decision tree.

2. Background of the Invention

A decision tree may provide a mechanism for analyzing data. In a computerized decision-tree analysis, data may be applied to different distinctions at nodes in a decision tree. A distinction in a decision node may split into multiple paths to additional nodes. By making determinations at different nodes based on the data, a particular path through a decision tree may be selected and a termination point (e.g., leaf or leaf node) of the decision tree may be reached. The leaf may provide or indicate something potentially useful about the data arriving thereat.

In practice, not all data is of equal quality. For example, in certain situations or records, selected data may be missing. In a typical computerized decision-tree analysis, missing data may lower the quality of the results produced. Accordingly, what is needed is a decision-tree system and method that is well suited for handling instances of missing data.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the inventions, as represented in the Figures, is not intended to limit the scope of the invention, as claimed, but is merely representative of certain examples of presently contemplated embodiments in accordance with the inventions. The presently described embodiments will be best understood by reference to the drawings, wherein like parts are designated by like numerals throughout.

Classification of records may serve many useful functions with respect to the management of data and the extraction of useful information from data. By way of example and not limitation, with respect to managing data, classification may make possible more efficient storage and may allow linked records to be combined and/or leveraged for additional benefit. Furthermore, data classification may allow patterns and trends within the data to manifest. As can be appreciated, many additional applications of data classification may exist.

Decision trees in accordance with the present invention may be well suited to data classification. In selected embodiments, decision trees may apply data from a record to individual decision nodes, or vice versa, either in terms of quantitative comparisons or qualitative determinations, or in terms of both quantitative comparisons and qualitative determinations. That is, a unit of data may have multiple aspects that may be expressible in terms of both quantitative values and qualitative determinations. In some examples, data may have a potential to express information in terms of either a quantitative value or a qualitative determination.

In selected embodiments, improvements may be harnessed in terms of the ability of a unit of data to express information in terms of potential quantitative and qualitative aspects of the unit of data and/or their relationship. Additional improvements may also be obtained in the structuring of decisions trees to harness predictive power latent in such aspects and/or their relationships. These additional improvements may be incorporated into a decision tree during the generation and/or training of the decision tree.

Figure 1:
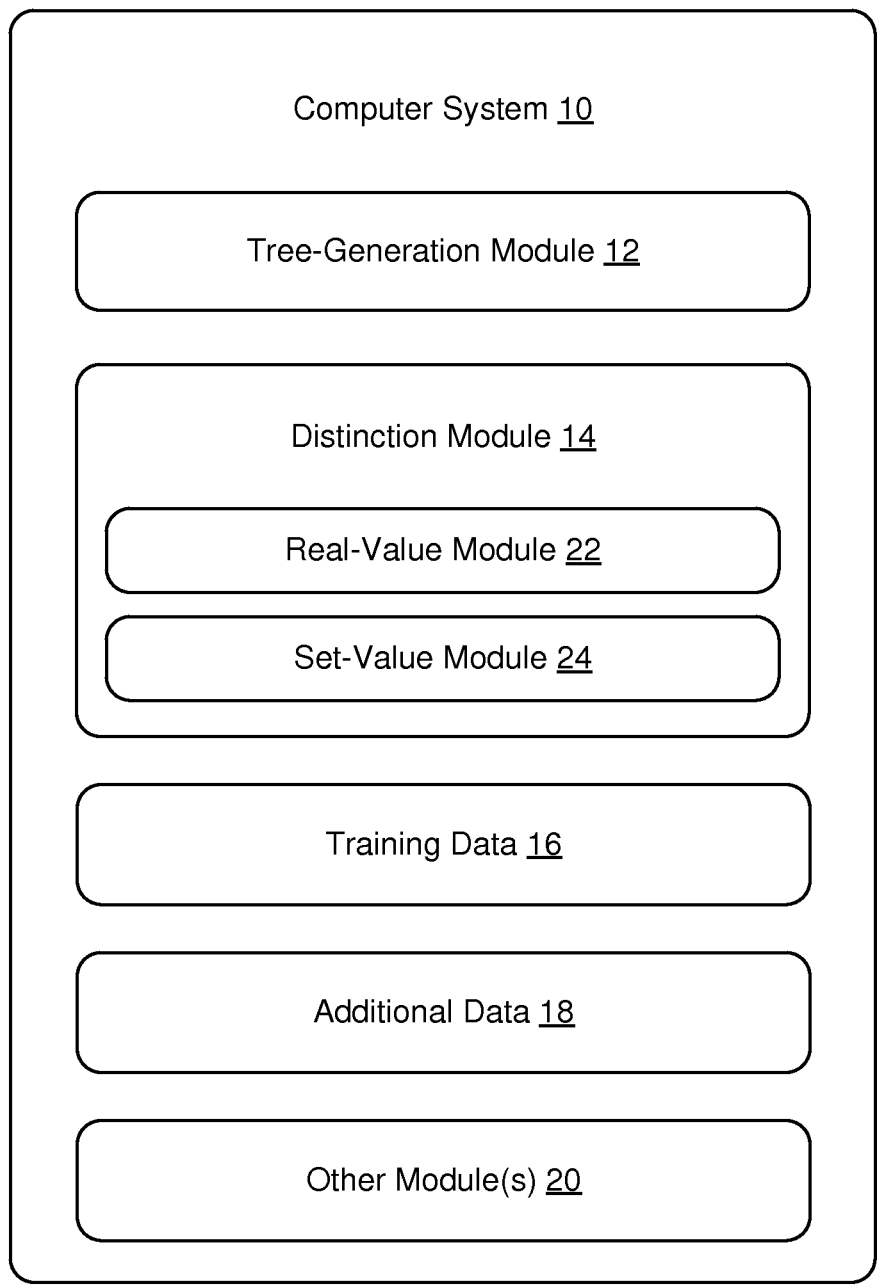
FIG. 1 is a schematic block diagram of one embodiment of a system in accordance with the present invention.

Referring to FIG. 1, a computer system 10 in accordance with the present invention may provide improved classification of one or more records, one or more pairs of records, or the like by applying information in those records to a decision tree. Throughout this application, a record may refer to any combination of data, whether comprising a single unit of data or multiple units of data, grouped according to a unifying principle for purposes of classification analysis. Classification, in certain embodiments, may involve assigning a target value or range of target values to a record or record pair and/or classifying a record or record pair within one or more classes.

In selected embodiments, a tree-generation module 12 within the decision-tree system 10 may generate and/or train the decision tree used by a distinction module 14 to classify a record or record pair. A tree-generation module 12 may use training data 16 to generate and/or train the decision tree. A distinction module 14 may then apply a record or record pair from additional data 18 to the decision tree, or vice versa, to classify the record or record pair. Other module(s) 20 may provide additional functionality to facilitate the classification of records or record pairs with respect to a decision tree.

A distinction module 14 within the computer system 10 may access structured data comprising a decision tree from a data store. A data store may reside in part, or in whole, with training data 16, additional data 18, or in another location. Also, a distinction module 14, may access a record from additional data 18 in an additional data store having one or more records to be analyzed according to a decision tree. The additional data store may reside in whole or in part with training data 16, within a data store, or separate and apart from these locations.

A distinction module 14 may be operable to select between multiple paths extending from a node in a decision tree based on a unit of data from a record or multiple units of data from a record pair. Such data may carry information relevant to a distinction of the node. Also, a distinction module 14 may further comprise a real-value module 22. A real-value module 22 may be operable to make a first, quantitative comparison between data corresponding to one or more records and a predetermined numerical value for a distinction at a given node corresponding to data.

A distinction module 14 may also include a set-value module 24 operable to make a second, qualitative comparison, or qualitative determination, between such data and a predetermined set of elements with a predetermined attribute or feature for the same distinction at the same node. A distinction module 14 may select a path from the multiple paths based on at least one of the first comparison and the second comparison. Hence, by means of a real-value module 22 and a set-value module 24, a distinction module 14 may make both a quantitative comparison and/or a qualitative determination in response to a single distinction at a single node of a decision tree.

Also, during generation of a decision tree and/or training of the decision tree, a tree-generation module 12 may take into account actual examples of ways in which units of data express quantitative and qualitative values. The resultant decision tree, therefore, may be informed by information embedded in quantitative and qualitative values and their relationships in the training data 16 at the granularity of a decision tree node. This additional information may improve the predictive power of a decision tree with respect to one or more records in the additional data 18.

Embodiments in accordance with the present invention may be embodied as an apparatus (system), method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. In selected embodiments, the program code may execute entirely on one or more master computing nodes, worker computing nodes, or combinations thereof. In selected embodiments, one or more master and/or worker computing nodes may be positioned remotely with respect to one another. Accordingly, such computing nodes may be connected to one another through any type of network, including a local area network (LAN) or a wide area network (WAN), or the connection may be made through the Internet using an Internet Service Provider.

Embodiments may also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that may be rapidly provisioned via virtualization and released with minimal management effort or service provider interaction, and then called accordingly. A cloud model may be composed of various characteristics (e.g., on-demand self-service, broad network access, resource pooling, rapid elasticity, measured service, etc.), service models (e.g., Software as a Service ("SaaS"), Platform as a Service (PaaA"), Infrastructure as a Service ("IaaS"), and deployment models (e.g., private cloud, community cloud, public cloud, hybrid cloud, etc.).

Figure 2:
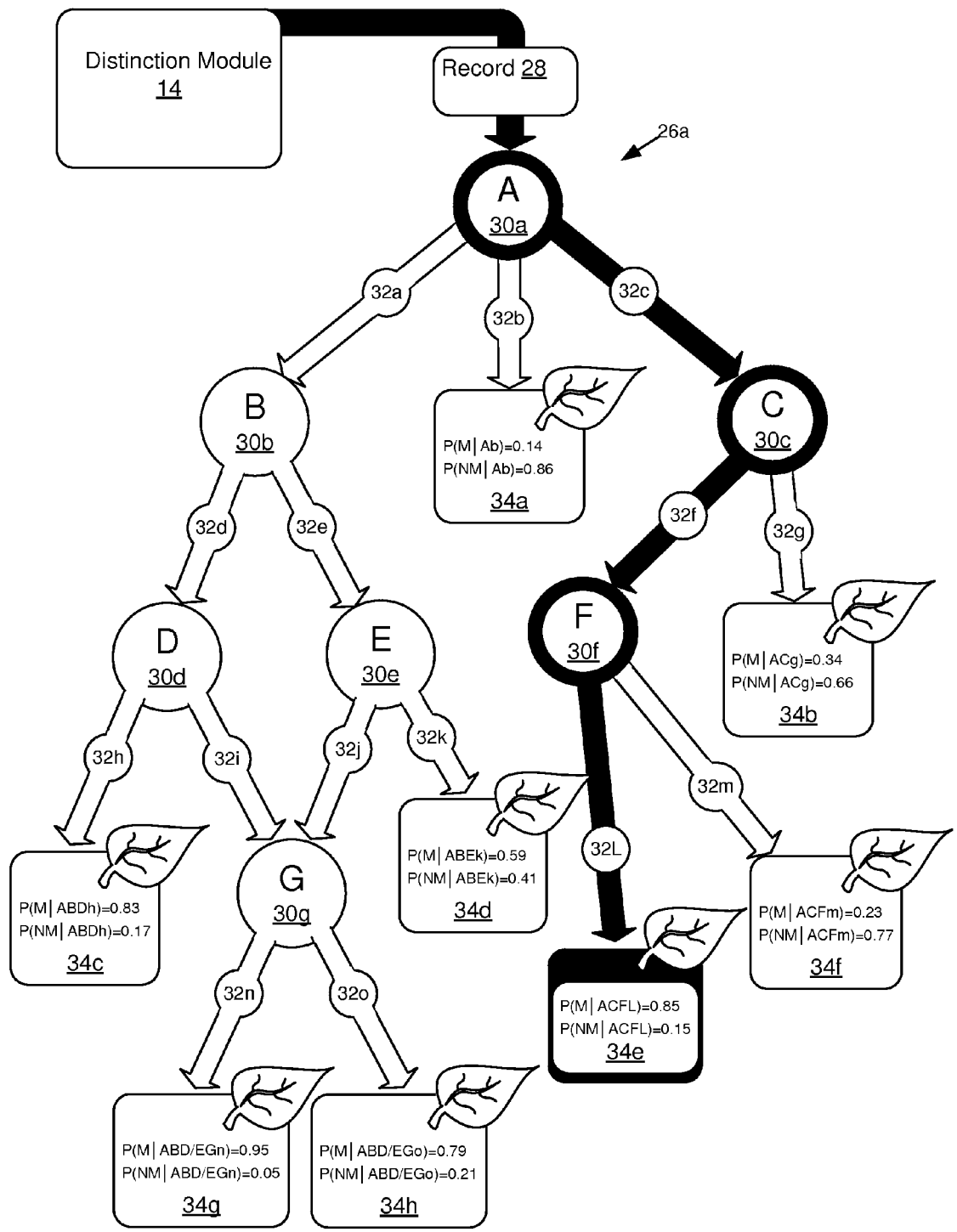
FIG. 2 is a schematic block diagram of one embodiment of a decision tree in accordance with the present invention.

Referring to FIG. 2, a decision tree 26*a* is depicted. The decision tree 26*a* may comprise multiple nodes 30. Although only seven nodes 30*a*-30*g* are depicted in FIG. 2, any number of nodes 30 may be included in a decision tree 26. A distinction module 14 may commence analysis of a record 28 from the additional data 18 in terms of the decision tree 26*a* at a first node 30*a*.

Paths, or branches, 32*a*, 32*c* may extend from the first node 30*a* to additional nodes 30*b*, 30*c*. Although examples in FIG. 2 only depict instances with two and three branches 32 extending from a given node 30, any number of branches 32 are possible. Also, although less common, multiple paths 32*i*, 32*j* extending from different nodes 30*d*, 30*e* and arriving at a common node 30*g*, known as a sink node, are possible in certain examples. Additional paths 32 may in turn extend to yet more nodes 30. Nodes 30 in a decision tree 26 may present a distinction module 14 with distinctions with which to sort a record 28 toward a classification. The distinction module 14 may apply a distinction at the given node 30*a* to relevant data from the record 28 to be classified, or vice versa.

Based on the data from a record 28 or pair of records 28, as applied to the distinction, or based on the distinction as applied to the data, a distinction module 14 may select a path 32*c* from the multiple paths 32*a*, 32*b*, 32*c* extending from the given node 30*a* to proceed down the decision tree 26*a* as it analyzes the record 28. By selecting one path 32c as opposed to one or more alternative paths 32a, 32b, a distinction module 14 may sort the record 28 or pair of records 28 toward an appropriate classification.

A distinction module 14 may continue to sort the record 28 or record pair as it continues to select paths 32f, 32L in response to distinctions at additional nodes 30c, 30f within the decision tree 26 until a terminal point, referred to herein as a leaf 34e, of the decision tree 26, is reached. The leaf 34e may provide information that may be used by a distinction module 14 to classify the record 28 or pair of records 28. Such information may comprise a probability distribution, or density, either of which are referred to herein with the term probability distribution.

The probability distribution may be a conditional probability distribution for different outcomes with respect to a target variable. In FIG. 2, the target variable admits of two values, i.e., either a record 28 or pair of records 28 is a member of a particular class, with a probability denoted as P(M), or not a member of the particular class, with a probability denoted as P(NM). Such a conditional probability distribution may be conditioned upon the various nodes 30 and/or paths 32 traversed in arriving at a particular leaf 34 at which the distinction module 14 completes its sorting of the record 28.

In FIG. 2, the various nodes traversed are indicated after the '|' symbol used to indicate the conditions that obtain the corresponding probability distribution. The last letter in the string of letters indicative of the condition that corresponds to the final branch 32 selected to arrive at the corresponding leaf 34. As noted by the probability notation in leaf 34e, the nodes and final branch traversed are denoted as "|ACFL." Also, as indicated by the leaf 34e arrived at by a distinction module 14 in FIG. 2, the probability that the record 28 or pair of records 28 is a member of the target class is much greater, P(M)=0.85, than the probability that the record 28 or pair of records 28 is not a member of the target class, P(NM)=0.15. With respect to leaves 34g and 34h, two different probabilities for each of P(M) and P(NM), one for each nodes 30d, 30e have been summed.

Figure 3:
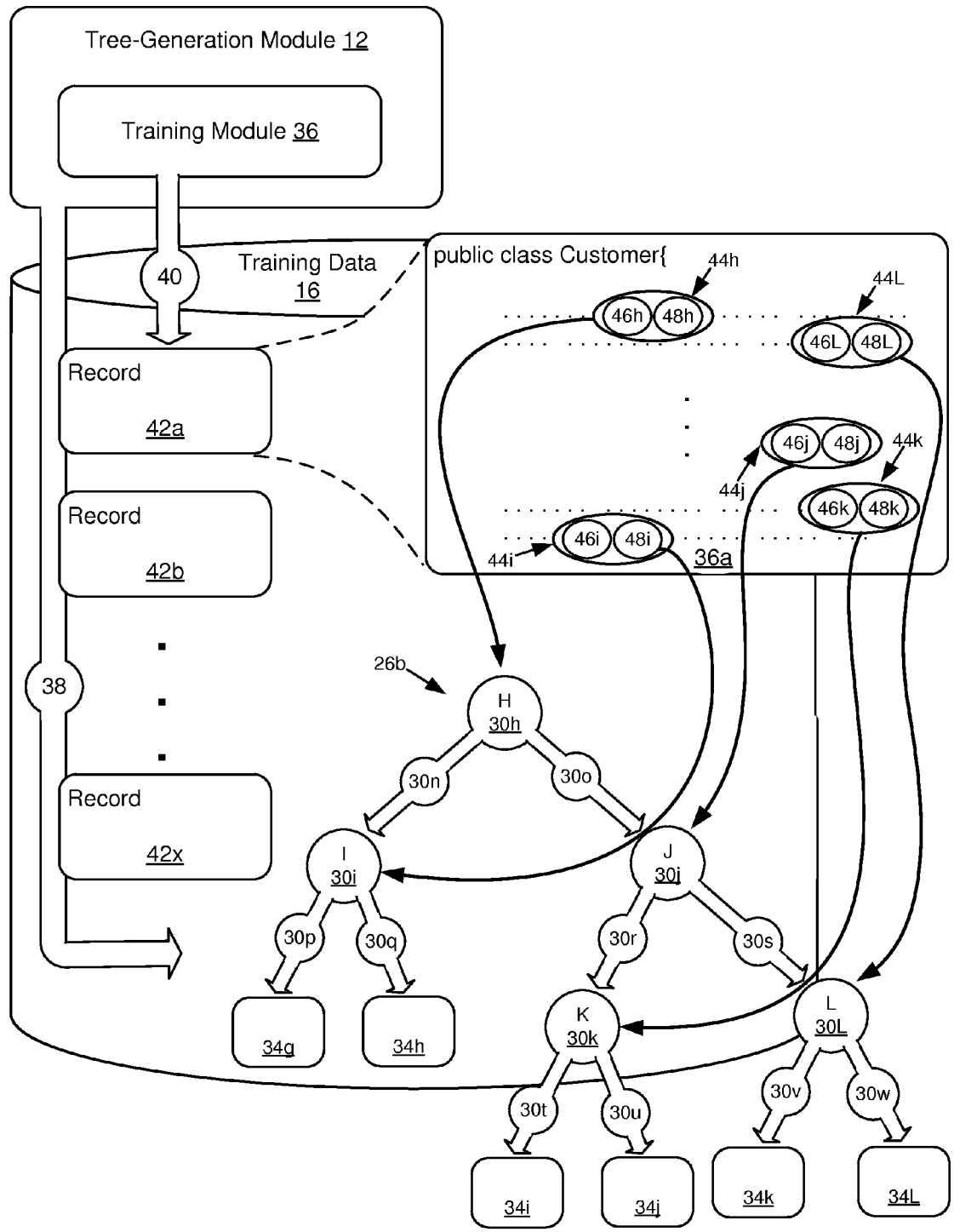
FIG. 3 is a schematic block diagram of a tree-generation module and a training module generating a decision tree and training distinctions at nodes in the decision tree with units of data, having both real value and set values, from multiple known training records, in accordance with the present invention.

Referring to FIG. 3, a tree-generation module 12, together with a training module 36, are depicted generating 38 and/or training 40 a decision tree 26b with training records 42 in the training data 16, which may reside in a training data store. In some embodiments, a tree-generation module 12 may generate the decision tree 26b in the data store as a probability estimation tree (PET). With respect to the generation 38 of the decision tree 26b, a tree-generation module 12 may apply a machine learning algorithm to generate 38 the decision tree 26b with multiple training records 36 in the training data 16. Some or all of the characteristics of the training records 36 may be known, or read, by a tree-generation module 12 and/or a training module 36.

For purposes of illustration, a first training record 42a in the training data 16 is expanded to demonstrate some constitutive elements. The enlarged first training record 42a is depicted as an instance of a class in an object-oriented environment. However, the record may be ordered according to any number of structures.

The characteristics of the training records may include one or more features or attributes together with one or more target features or attributes. An attribute/feature, or target attribute/feature, may be encoded in one or more units of data 44 within a training record 42. Since the characteristics of the training records 42 are known, the machine learning algorithm may be a supervised learning algorithm.

A tree-generations module 12 may apply a machine learning algorithm to select units of data 44 to determine nodes 30 of the decision tree based on the attributes/features encoded in the units of data 44 of the training records 42. In applying the learning algorithm, a tree-generation module 12 may determine various nodes 30 of the decision tree 26b and the branches, or paths, 32 between them so that attributes/features associated with various nodes more accurately predict the known target attributes/features at leaves 34 of the decision tree 26b.

A node 30 in the decision tree 26b may have a single distinction setting apart multiple branches 32 extending from the node 30. A tree-generation module 12 may also create distinctions at the various nodes 30 that can later be used to sort a record 28 or pair of record 28. Again, a tree-generation module 12 may rely on units of data 44 within the training records 42 to determine, or set, distinctions at nodes 30 that improve the ability predict the known target attributes/features at leaves 34 of the decision tree 26b.

As depicted in FIG. 3, a single unit of data 44 may carry information pertaining to a particular distinction at a particular node 30. For example, a unit of data 44h may carry information pertaining to node 30h; unit of data 44i may carry information pertaining to node 30i, and so on. As used herein, a unit of data 44 may refer to one or more data values from one or more regions in a record 28 that carry information relevant to, or pertaining to, a given distinction at a given node 30 in a decision tree 26. In some examples, a unit of data 44 may carry information pertaining to multiple distinctions at multiple nodes 30.

As discussed, a single unit of data 44 may have multiple aspects that may be expressed in both quantitative and/or qualitative terms and/or quantitative comparisons and/or qualitative determinations relative to a distinction at a node 30. The potential of a unit of data 44 to have a quantitative aspect may be expressed as a potential real value 46 of the unit of data. As used herein, a real value may refer to a numerical, or quantitate value, which in some examples, may involve a complex number with a real and an imaginary part. In some examples, a unit of data 44 may include multiple real values. However, for the sake of clarity, it will be understood that the term actual value may refer to multiple actual values from a unit of data 44.

Similarly, the potential of a unit of data 44 to have a qualitative aspect may be expressed as a potential set value 48 of the unit of data. As used herein, a set value 48 may refer to a value making a qualitative distinction, e.g., designating that the unit of data embodies, or has, a particular feature or attribute defined for a set of elements embodying, or having, that particular attribute or feature. A set value, as used herein, may refer to a set of multiple subsets, with individual subsets defined to include elements with certain attributes or features. The subsets may be related to one another by Boolean logic, or in any number of ways, as exemplified by the mathematics of set theory.

Some units of data 44 may be expressible either as a real value 46 or as a set value 48, while other units of data 44 may be expressible in terms of both a real value 46 and a set value 48. By way of illustration and not limitation, a single unit of data 44 may be missing data for a real value 46. Therefore, although a unit of data 44 may have the potential for a real value 46, the potential may not be realized, but the same unit of data 44 may also have a set value 48 in terms of its membership in the set of units of data 44 with missing values. Conversely, a unit of data 44 may have a real value 38 in terms of numerical data while at the same time having a set value 48 in terms of its membership in the set of units of data 44 without missing values. In alternative embodiments, a set value 48 may provide additional classification with respect to a given attribute/feature for a corresponding real value 46 within the unit of data 44.

As can be appreciated, any number of relationships between any number of real values 46 and set values 48 are possible with respect to units of data 44. Additional information may reside in the combination of real values 46 and set values 48 and/or relationships between real values 46 and set values 48. This additional information may improve the ability of the data tree 26b to classify a record 28 or pair of records 28 with respect to a target attribute/feature.

During generation of a decision tree and/or training of the decision tree, a tree-generation module 12 may take into account actual examples of ways in which units of data 44 express real values 46 and/or set values 48. The resultant decision tree 26b, therefore, may be informed by information embedded in the relationships between real value and set value expressions. A tree-generation module 12 may harness this additional information by making its determinations as to nodes 30, distinctions, branches/paths 32, and leaves 34 that make up a decision tree 26b informed by the quantitative and qualitative aspects of units of data 44 and the relationships between them in the potential real values 46 and set values 48 latent in the units of data 44 of the training records 42. This additional information can improve the predictive power of a decision tree 26 with respect to one or more records 28 in the additional data 18.

Additionally, a tree-generation module 12 may account for the quantitative and qualitative aspects of units of data 44 by providing distinctions that address both real values 46 and/or set values 48. The tree-generation module 12 may create, or set, such distinctions with a predetermined real value and a predetermined set value. Although a predetermined real value may include multiple real values and/or a predetermined set value may include multiple set values, combined according to Boolean logic or in other ways contemplated by the mathematics of set theory, the terms "predetermined real value" and "predetermined set value" are used herein for the sake of clarity.

Where a real value 46 compared to a predetermined real value, or a set value 48 is compared to a predetermined set value, real-value and set-value relationships may result. A tree-generation module 12 may assign potential combinations of real-value relationships and set-value relationships to paths 32 between the nodes 32. In other words, different combinations of real values 46 and set values 48 from the multiple records 42 relative to the predetermined real value and the predetermined set value of a node 30 may be assigned by a tree-generation module 12 to different paths 32 extending from the node 30 according to known paths of corresponding training records 42. As a result, the very structure of the decision tree 26b may be informed by the quantitative and qualitative aspects of the units of data 44 in the training records 42.

A decision tree 26b with one or more nodes 30 having a distinction with both a predetermined real value and a predetermined set value may improve the ability of that node 30 to sort a record 28 or pair of records 28. As a distinction module 14 sorts a record 28 or pair of records 28 with respect to a decision tree 26b, the distinction module 14 may eventually arrive at a leaf 34 of the decision tree 26b at which a conditional probability distribution for a target attribute/feature may be used to classify the record 28 or pair of records 28. A training module 36 may generate the probability distribution based on the known values expressed by the training records 42 that the training module 36 sorts to the leaf 34 as informed by both real values 46 and set values 48 relative to the predetermined real value and the predetermined set value of one or more nodes 30 respectively.

In other words, a training module 36 may train the decision tree 26b by accounting for a known path of a training record 42 or pair of training records 42 from the multiple paths 32 extending from a node 30. A training module 36 may make such an accounting by accounting for a first relationship between a unit of training data 44 from one or more training records 42 and the predetermined real value of the node 32. A training module 36 may also account for a second relationship between the unit of training data 44 and the predetermined set value of the node 30. Consequently, a leaf 34 at a terminal end of the decision tree 26b may comprise a conditional probability distribution generated by the training module 36 for a target feature.

In some embodiments, a training module 36 may work on portions of a pre-existing decision tree 26b. In others, the training-module functions may be intertwined with those of a tree generation 12 module. However, the processes of generation 38 and training 40 may be carried out so that the decision tree 26b and the conditional probabilities in its leaves 34 are informed by quantitative and/or qualitative aspects of units of data 44 and distinctions that can take into account these aspects and their relationship at a single node 30.

Figure 4:
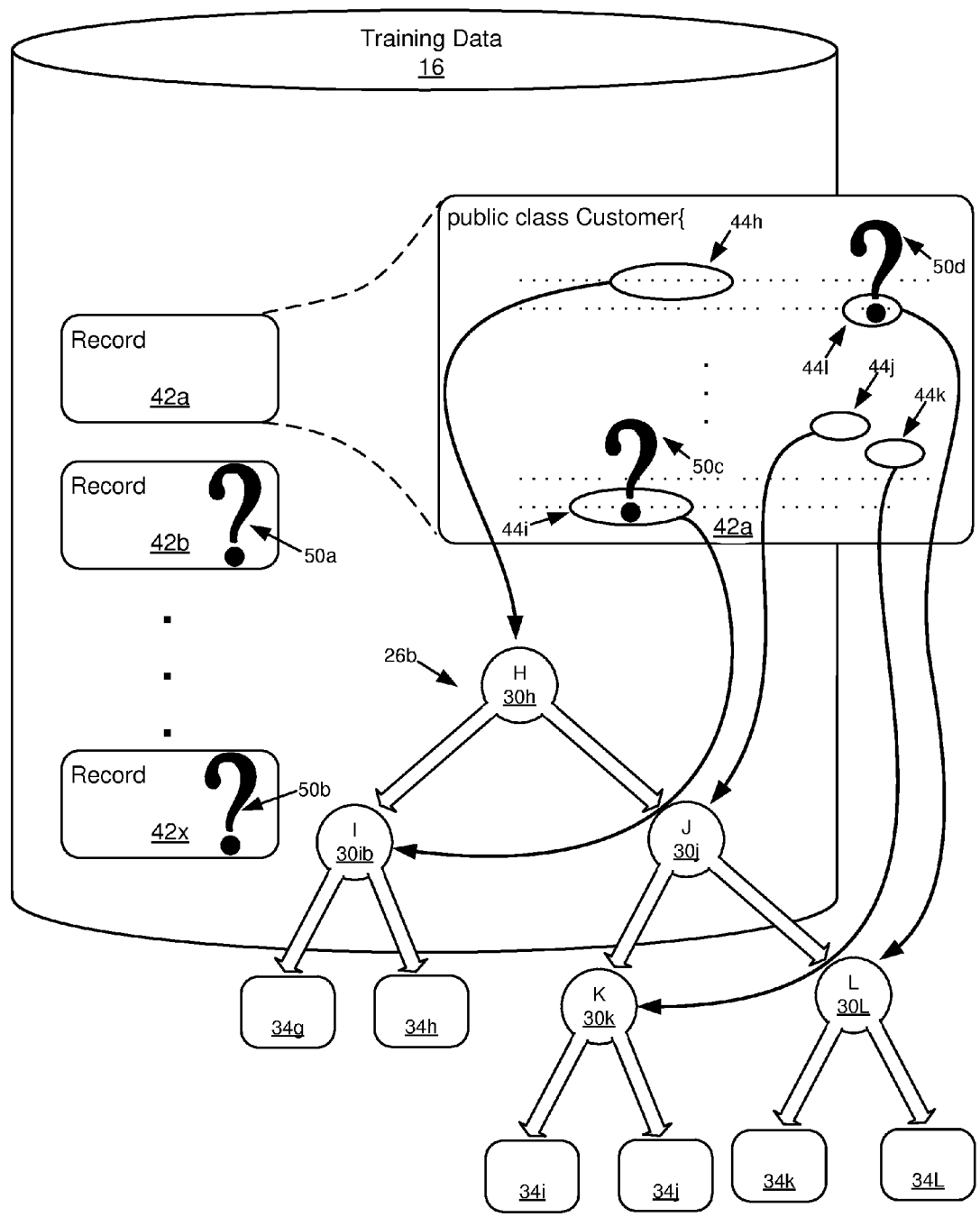
FIG. 4 is a schematic block diagram of a decision tree informed by missing data in training records used to generate and/or train the decision tree.

Referring to FIG. 4, relationships between training records 42 and a generated and trained decision tree 26b are depicted for a special case in which set values 48 indicate whether or not a unit of data 44 is missing data. A first instance of missing data 50a is present in the second training record 42b. A second instance of missing data 50b is present in the final training record 42x.

In the expanded view of the first training record 42a, a third instance 50c and a fourth instance 50d of missing data are present with respect to individual units of training data 44 within the first training record 42a. The third instance of missing data 50c arises in the unit of data 44b corresponding to node 130i of the decision tree 26b. The fourth instance of missing data 50d appears in the unit of data 44e corresponding to node EL 301 of the decision tree 26b.

During generation 38 and/or training 40 of a decision tree 26b, a tree-generation module 12 and/or a training module 36 may be informed by this additional information. The machine learning algorithm of a tree-generation module 12 may use missing data as an attribute with which to determine nodes of the decision tree 26b, set predetermined real or set values, and to assign combinations of real-value relationships and set-value relationships to paths 32 between the nodes 30.

Therefore, during generation 38 and/or training 40 of the decision tree 26b, the units of data 44 may speak for themselves with respect to the manner in which the presence or absence of data should shape the structure, distinctions, and probability distributions of the decision tree. As a result, a computer system may avoid making global decisions, or decisions that may affect the sorting of a record 28 or pair of records 28 at multiple nodes. A record 28 or pair or records 28 with one or more instances of missing data 50 may simply be sorted or processed as any other record 28 or pair of records 28.

Figure 5:
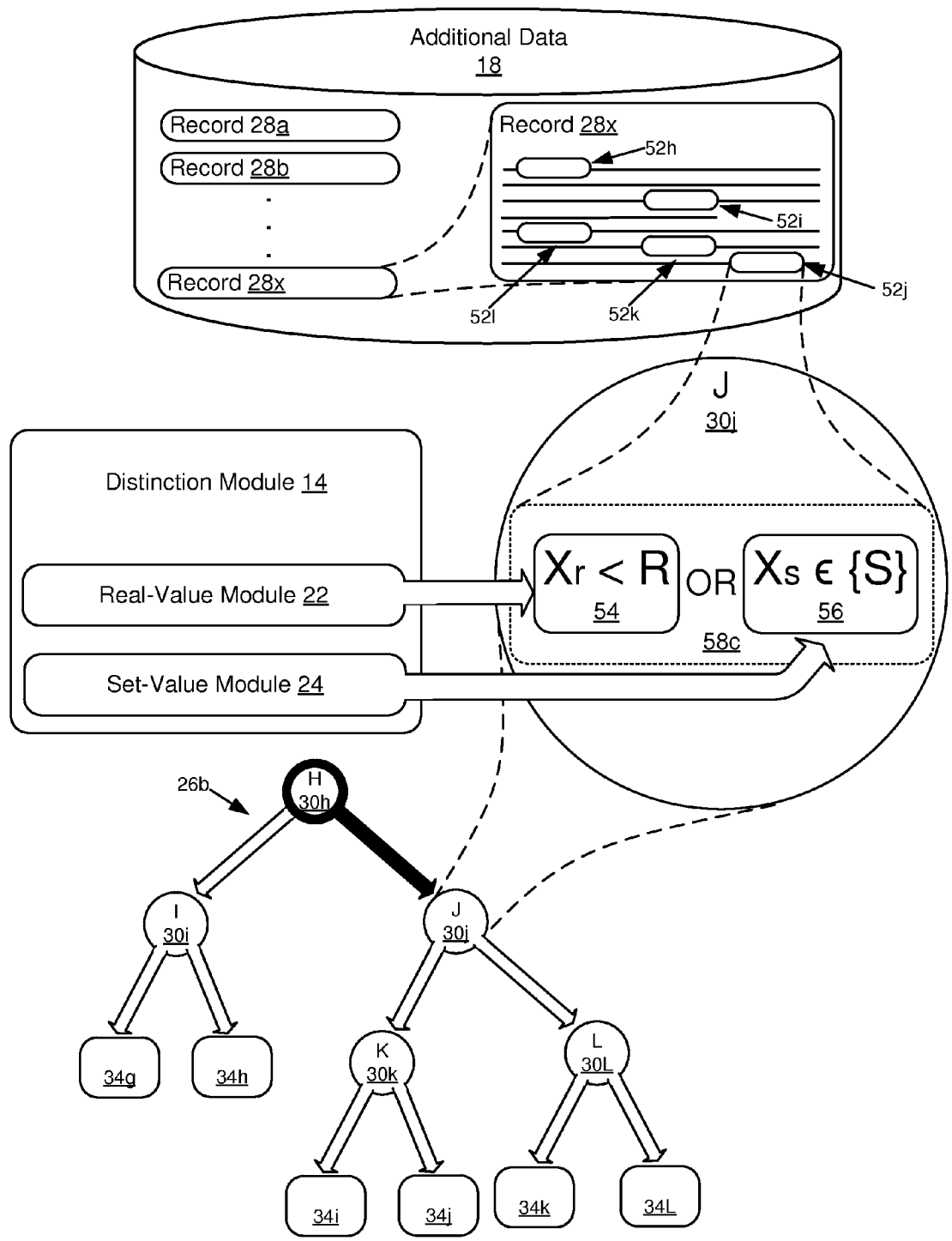
FIG. 5 is a schematic block diagram of a distinction module, with corresponding real-value and set-value modules respectively applying a real-value comparison and making a set-value determination in response to a distinction at a node of a decision tree.

Referring to FIG. 5, a distinction module 14, with corresponding real-value and set-value modules 22, 24 is depicted respectively making a real-value comparison 54 and making a set-value determination 56 in response to a distinction 58j at a particular node 30j in a decision tree 26b. A distinction module 14 may access a decision tree 26a residing as structured data in a data store. Also, a distinction module 14, may access a record 28x from the additional data 18 in an additional data store, where one or more records 28 may await classification.

The record 28x accessed by a distinction module 14 may include multiple units of data 52 relevant to the decision tree 26b. In the example depicted in FIG. 5, a distinction module 14 has arrived at Node J 30j in the decision tree 26b. From the multiple units of data 52, indicated by number 52 as opposed to number 44 used for units of data in training records 42, in the record 28x, a distinction module 14 may extract the unit of data 52j with information pertaining to, relevant to, or addressing the distinction 58j at node J 30j, which has been enlarged for purposes of explanation.

By way of illustration and not limitation, in certain examples, distinctions 58 at nodes 30 in a decision tree 26b may be indexed to different fields, or regions, in a record 28. As a distinction module 14 proceeds along a decision tree 26b to a given node 30j, the distinction module 14 may access a unit of data 52j from one or more regions of one or more records 28 to which the distinction 58j at that node 30c is indexed. In alternative, non-limiting examples, a distinction module 14 may read information from the distinction 58j at a given node 30j and then search a record 28x or pair of records 28 being analyzed for data capable of addressing the distinction 58j.

As discussed previously, the distinction 58j may be provided with both a predetermined real value, denoted as "R" in FIG. 5, and a predetermined set value, denoted as "S" in FIG. 5. A distinction module 14 may apply the distinction 58j at the given node 30j to the unit of data 52j, or vice versa. A real-value module 22 within a distinction module 14 may make a real-value comparison 54 by comparing a real value, denoted as "Xr" in FIG. 5, derived, whether directly or indirectly, from the unit of data 52j to the predetermined real value, R.

In the example depicted in FIG. 5, the comparison 54 is comparing whether the real value, Xr, is less than the predetermined value R. Additional non-limiting examples of such comparisons may also include comparisons as to whether a real value, Xr, from the relevant unit of data 52j is greater than, or equal to the predetermined real value, R, of the distinction 58j, or within a predefined range or ranges. In examples involving multiple predetermined values associated with a given node 30j, those predetermined values may be combined in various ways, including, without limitation, by Boolean logic.

A real value, Xr, may be derived directly from a unit of data 52 by a distinction module 14, and/or a real-value module 22, reading the real value, Xr, from a unit of data 52. Additionally, a real value, Xr, may be derived indirectly from a unit of data 52. By way of illustration and not limitation, a distinction module 14, and/or a real-value module 22, may compare one or more aspects of a unit of data 52 with one or more aspects of another unit of data 52 from another record 28 and/or apply one or more functions to one or more aspects of the unit of data 52. In examples involving comparisons between multiple units of data 52, a real value, Xr, may comprise a value of a difference/variance between the two units of data 52.

a distinction module 14 may also include a set-value module 24 operable to make a second comparison between a set value, denoted as "Xs" in FIG. 5, from the unit of data 52j and a predetermined set value, S, for the distinction 58j. In other words, the set-value module 24 may determine a relationship between a set value, Xs, associated with the relevant unit of data 52j, and the predetermined set value, S, for the particular distinction 58j. A set-value module 24 may determine a relationship between the set value, Xs, and the predetermined set value, S. Several different types of relationships are possible.

In the example depicted in FIG. 5, the set-value module 24 may make a second comparison 56 by determining whether the unit of data 52j comprises an element of a set in terms of the set value, Xs, of the relevant unit of data 52j. The set may be defined by the predefined set value, S. In certain embodiments, the predefined set value may define a set that includes a unit of data 52 with missing data. In such embodiments, a set-value module 24 may determine that the unit of data 52j is a member of the set where the unit of data 52j is missing data and determine that the unit of data 52j is not a member of the set where the unit of data 52j is not missing data. Therefore, in such embodiments, a set-value 24 module may first determine that the unit of data 52j is missing data. In certain non-limiting examples, a unit of data 52 may indicate missing data by carrying a default value that may be overwritten with data.

As an additional, non-limiting example, in some embodiments, the predefined set value, S, may define a set that includes a unit of data 52 for which a request to provide data for the unit of data 52 has been declined. As non-limiting, alternative examples of potential relationships between a set value, Xs, and the predetermined set value, a set-value module 24 may determine whether the set value, Xs, is an opposite of the predetermined set value or if the set value, S, and predetermined set value are subsets of a common overarching set.

The results of a real-value comparison 54 and a set-value determination 56 may be related to one another by the distinction 58j of the node 30j. In the example depicted in FIG. 5, the distinction 58j relates the real-value comparison 54 and the set-value determination 56 with the disjunctive "OR" for purposes of sorting records. However, distinctions 58 may relate real-value comparisons 54 and the set-value determinations 56 with all manner of logical relationships.

Figure 6:
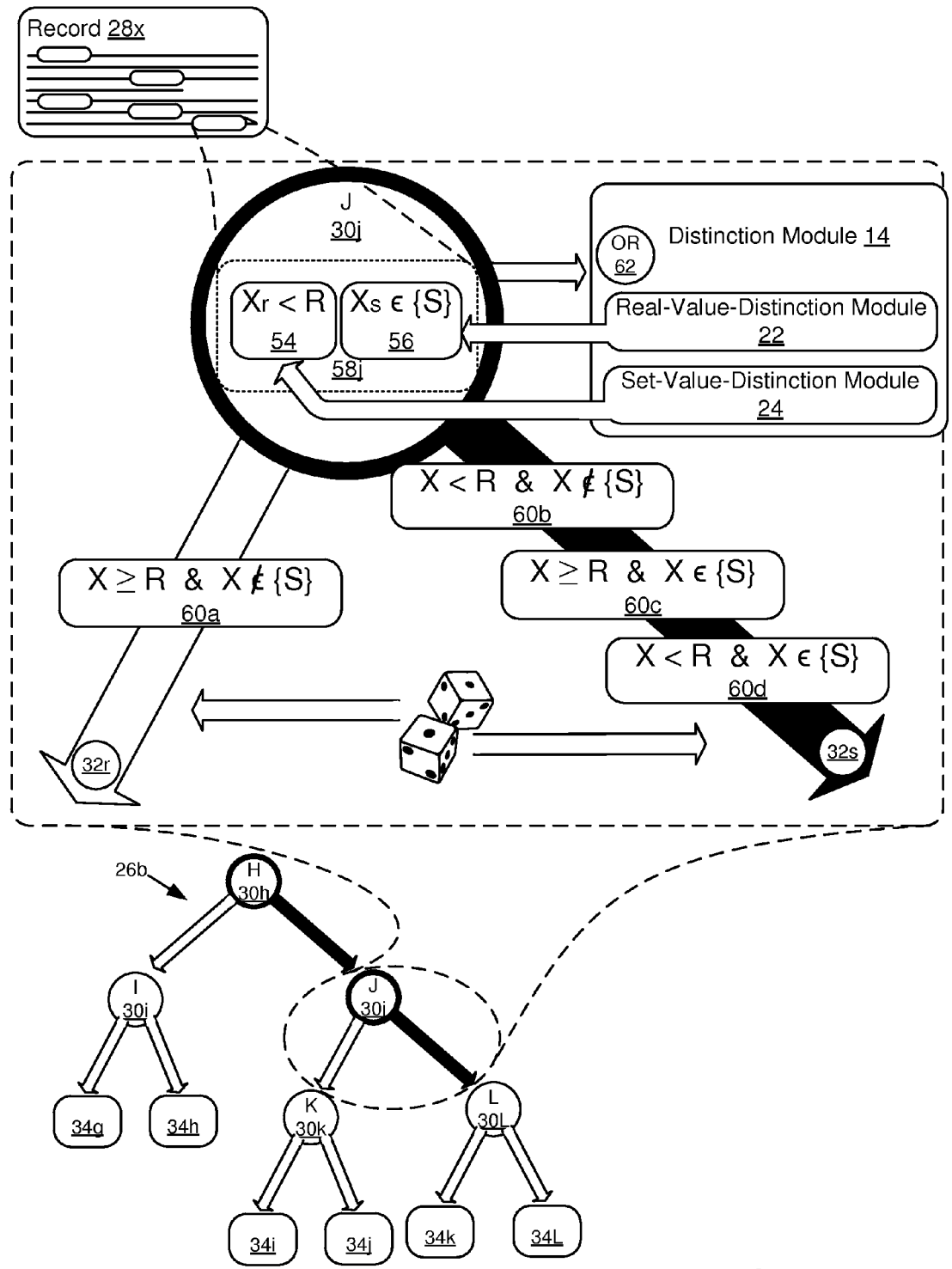
FIG. 6 is a schematic block diagram of a distinction module selecting between multiple paths extending from a node of a decision tree, the paths being assigned to corresponding potential combinations of real value comparisons and set value determinations, based on the corresponding real-value comparison and set-value determination of the unit of data from the record being analyzed, in accordance with the present invention.

Referring to FIG. 6, a distinction module 14 is depicted making a selection between paths 32 extending from a node 30j of the decision tree 26b according to a potential combinations 60 of real-value comparisons 54 and set-value determinations 56 assigned to the paths 32. As discussed previously, a tree-generation module 12 may assign potential combinations 60 of real-value comparisons 54 and set-value determinations 56 to nodes extending from the node 30j reflective of probabilities, as indicated by the dice, provided by the training data 16.

As discussed with respect to the preceding figure, a distinction module 14, may apply a corresponding unit of data 52j from a record 28x to the distinction at the node 30j, or vice versa. A real-value module 22 may make the real-value comparison 54, and a set-value module 24 may make the set-value determination 56. a distinction module 14 may also receive a logical relationship 62, which in FIG. 6 is the disjunctive OR, between the real-value comparison 54 and the set-value determination 56.

A distinction module 14 may select the branch 32s for which the assigned potential combination 60d matches the results of the real-value comparison 54 and the set-value determination 56 in terms of the logical relation imposed by the distinction 58j. As appreciated, in FIG. 6, this matching potential combination 60d is assigned to branch 32s.

Figure 7:
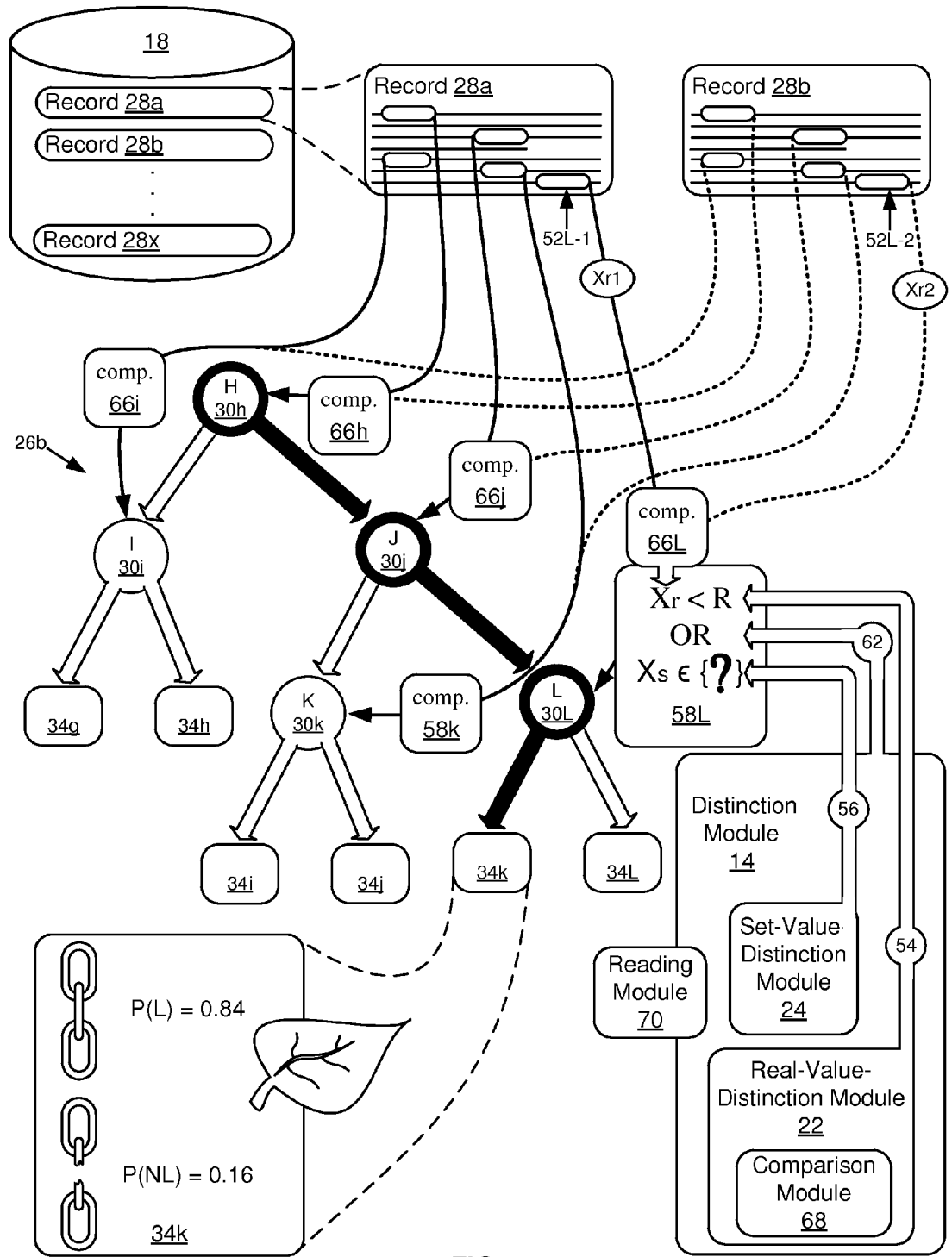
FIG. 7 is a schematic block diagram of a distinction module comparing units of data from two records to make real-value comparisons and set-value determinations to reach a leaf at which a probability distribution is provided as to whether the first record is linked to the second record, in accordance with the present invention.

Referring to FIG. 7, a distinction module 14 is depicted comparing units of data 52 from a first record 28a and a second record 28b with the assistance of a decision tree 26b do determine whether the records 28a, 28b are linked. A distinction module 14 may access the decision tree 26b from within a data store. The first record 28a and/or the second record 28b may also reside in the data store, which may include multiple records. Additionally, the second record 28b may reside with the additional data 18 in the additional data store and/or in another data store. For purposes of clarifying the generality with which the term "data store" is applied, the data store may include several different sub-data stores, such as the additional data 18 to be analyzed.

For purposes of explanation, embodiments consistent with FIG. 7 are explained in terms of activities taking place at node L 30L of the decision tree 26b. However, similar activities may take place at other nodes 30. In certain examples, a subset of records 28 from a larger store of records 28 may be selected for comparison with each other based on a common feature, such as, by way of a non-limiting example, a common zip code stored within the records 28. A distinction module 14 may extract a first unit of data 52L-1 from a first record 28a and a second unit of data 52L-2 from a second record 28b.

A distinction module 14 may extract the units of data 52 from the two records 28a, 28b based on a determination that the units of data 52L-1, 52L-2 carry information allowing a distinction module 14 to select from among multiple paths 32 extending from a node 30 of the decision tree 26b in response to a distinction 58 of the node 30. In some embodiments, a distinction module 14 may be provided with a comparison module 68. A comparison module 68 may be operable to provide a distinction module 14 with the unit of comparison data 52L-2 from the second record 28b carrying information relevant to the distinction 58 of the node 30.

As before, a distinction module 14, may select a path 32 from the multiple paths 32 based on a real-value comparison 54 and a determination 56 with respect to set inclusion, carried out by a real-value module 22 and a set-value module 24. To carry out a real-value 54 comparison, however, a real-value module 22 may carry out an initial comparison 66L between a first real value, denoted in FIG. 7 as "Xr1," of the first unit of data 52L-1 and a second real value, denoted in FIG. 7 as "Xr2," of the second unit of data 52L-2. As before, a set-value module 24 may determine whether the first unit of data 52L-1 or second unit of data 52L-2 is a member of a set defined by a predetermined set value of the node 30l.

A real-value module 22 and/or a comparison module 68 may combine and/or compare the first real value, Xr1, and the second real value, Xr2, in any number of ways during an initial comparison 66L, to generate a combined real value, denoted in FIG. 7 as "Xr." In certain embodiments, by way of illustration and not limitation, the initial comparison 66L may involve determining a difference/variance between the first real value, Xr1, and the second real value, Xr2. In such embodiments, a real value module 22 may determine if the difference/variance, Xr, between the real value, Xr1, of the unit of data 52L-1 of the record 28a and a comparison real value, Xr2, of the unit of comparison data 52L-2 from the second record 28b is within a tolerance set by the predetermined real value, denoted in FIG. 7 as "R," of the node 30l. However, any number of comparisons 54 between the first real value, Xr1, the second real value, Xr2, and/or the predetermined real value Xr are possible.

Additional, non-limiting examples of initial comparisons 66 include possible comparisons between strings in the first unit of data 52L-1 and the second unit of data 52L-2. For example, a Levenshtein distance, or a normalized Levenshtein distance, between two first names in the first unit of data 52L-1 and the second unit of data 52L-2 may be calculated. The real-value 22 module may then make a comparison 54 of the Levenshtein distance, or a normalized Levenshtein distance, to the predetermined real value, R.

As before, a set-value module 24 may make a determination 56 of the relationship between a set-value of the first unit of data 52L-1, a second set value of the second unit of data 52L-2, or some combination thereof and a predetermined set value of the distinction 58j of the relevant node 30j. In the example depicted in FIG. 7, the predetermined set value is defined for the set whose elements have missing data, as indicated by the question mark. However, any number of predefined set values, as discussed above are possible.

As a result of a selection at node E 30e of the decision tree 26b, the distinction module selects leaf 34k of the decision tree 26b. The probability distribution in leaf 34k indicates a probability that the first record 28a and the comparison record 64 are linked, P(L), to be 0.85. Conversely, the same probability distribution indicates a probability that the records 28a, 64 are not linked, P(NL), to be 0.15.

A decision-tree system 10 may include a reading module 70. A reading module 70 may determine that the first record 28a and the second record 28b are linked where the largest probability from a conditional probability distribution in a leaf 34 of the decision tree 62b selected by the distinction module 14 so indicates. In examples where the two records 28a, 28b are linked, they may be linked, without limitation, in the sense that they pertain to a common individual or household. In selected embodiments where records 28a, 28b are linked, they may be merged.

In certain embodiments, a tree-generation module 12 and/or training module 36 generates 38, and/or trains 40, the decision tree 26b to determine a target feature, the feature being whether two records 28 are linked. This target feature may be whether two records 28 are linked by pertaining to a common individual or household. More generally, multiple training records 42 that are known to be linked to another record within the multiple training records 42 may be used. In some examples, these training records 42 may be known to be linked by recording information pertaining to a common individual or household.

A tree-generation module 12 may generate, by a machine learning algorithm, nodes 30, with corresponding distinctions 58, predetermined real values, R, and set values, S, and leaves 34 with conditional probability distributions providing a probability estimate as to whether a record 28 is linked to another record 28. A tree-generation module 12 may also assign paths 32 for various potential combinations 60 of a relationship between real values Xr of two records 28 and a predetermined real value, R, of one or more nodes 30 and a determination 56 as to whether a unit of data 52 is a member of, or exists in a particular relationship with, a set defined by the predetermined set value, S.

These assignments may become a basis for creating the leaves 34 of the decision tree 26b with the conditional probability distributions providing a probability estimate as to whether a record 28 is linked to another record 28. Because the real values, R, and set values, S, of the training records 42 used to generate the decision tree 26b, and whether those records 42 are linked, make up information that may be known and used by the tree-generation module 12, the structure of the decision tree 26b may harness this information.

With respect to FIGS. 8 and 9, for purposes of illustration, the present invention is now described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 8:
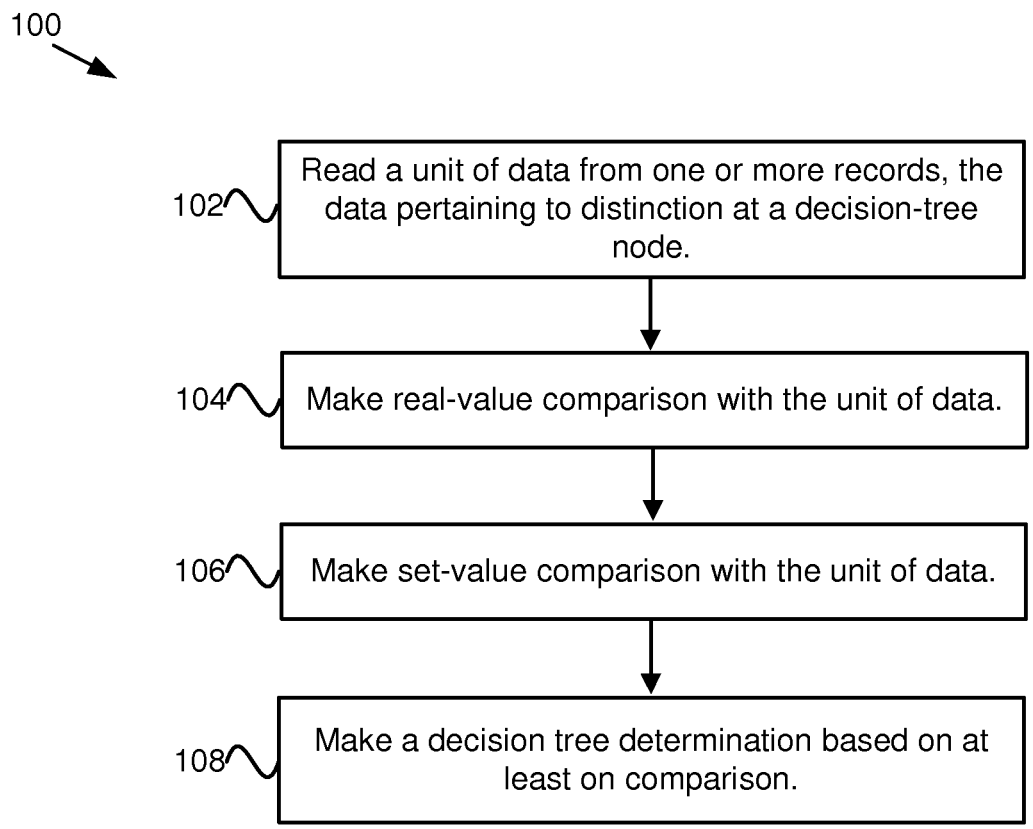
FIG. 8 is a schematic block diagram of a method for making real-value comparisons and making set-value determinations in a decision tree in accordance with the present invention.

Referring to FIG. 8, a method, or process, 100 for making real-value comparisons and making set-value determinations at individual nodes 30 in a decision tree 26 is depicted. The process 100 may include reading 102 a unit of data 52 from a record 28, the data pertaining to a distinction 58 at a node 30 in the decision tree 26. Such a process 100 may involve making 104 a real-value comparison 54 with a unit of data 52. In some embodiments, making 104 this comparison may involve comparing a real value, Xr, derived from a unit of data 52 in a record 28 from a data store to a predetermined real value for a distinction of a node in a decision tree to determine a real-value relationship. Additionally, the process 100 may involve making 106 a set-value comparison, or determination, with the same unit of data 52. In some embodiments, making 106 this set-value determination 56 may involve determining whether the unit of data 52 is a member of a set defined by a predetermined set value, S, of the distinction 58 of the node 30.

The process 100 may also involve making 108 a decision-tree determination based on at least one of the real-value and the set-value comparisons 54, 56. Such a determination may involve selecting a path 32 from multiple paths 32 extending from the node 30 in the decision tree 26b assigned to a combination 60 of the real-value relationship and the set-value determination corresponding to that of the unit of data 52. Some embodiments may also involve selecting a second unit of data 52L-2 from a second record 28b.

The second unit of data 52L-2 may carry information from a category of information common to the category of information carried by the unit of data 52L-1 from a first record 28a and a feature of the distinction 58 at a particular node 30. Such embodiments may also involve deriving a combined real value, Xr, by determining a difference/variance between the first unit of data 52L-1 and the second unit of data 52L-2. Additionally, embodiments may involve determining that a first record 28a is linked to a second record 28b at the end of the decision tree 26b. A link may be established where the conditional probability informed by the real values 54 and determinations 56 of missing data for the multiple training records 16 indicates a probability that the first record 28a is linked to the second record 28b above a threshold value, such as, without limitation, 0.5. In certain examples, this link may be established in as much as the first record 28a and the second record 28b contain information pertaining to a common individual or household.

Figure 9:
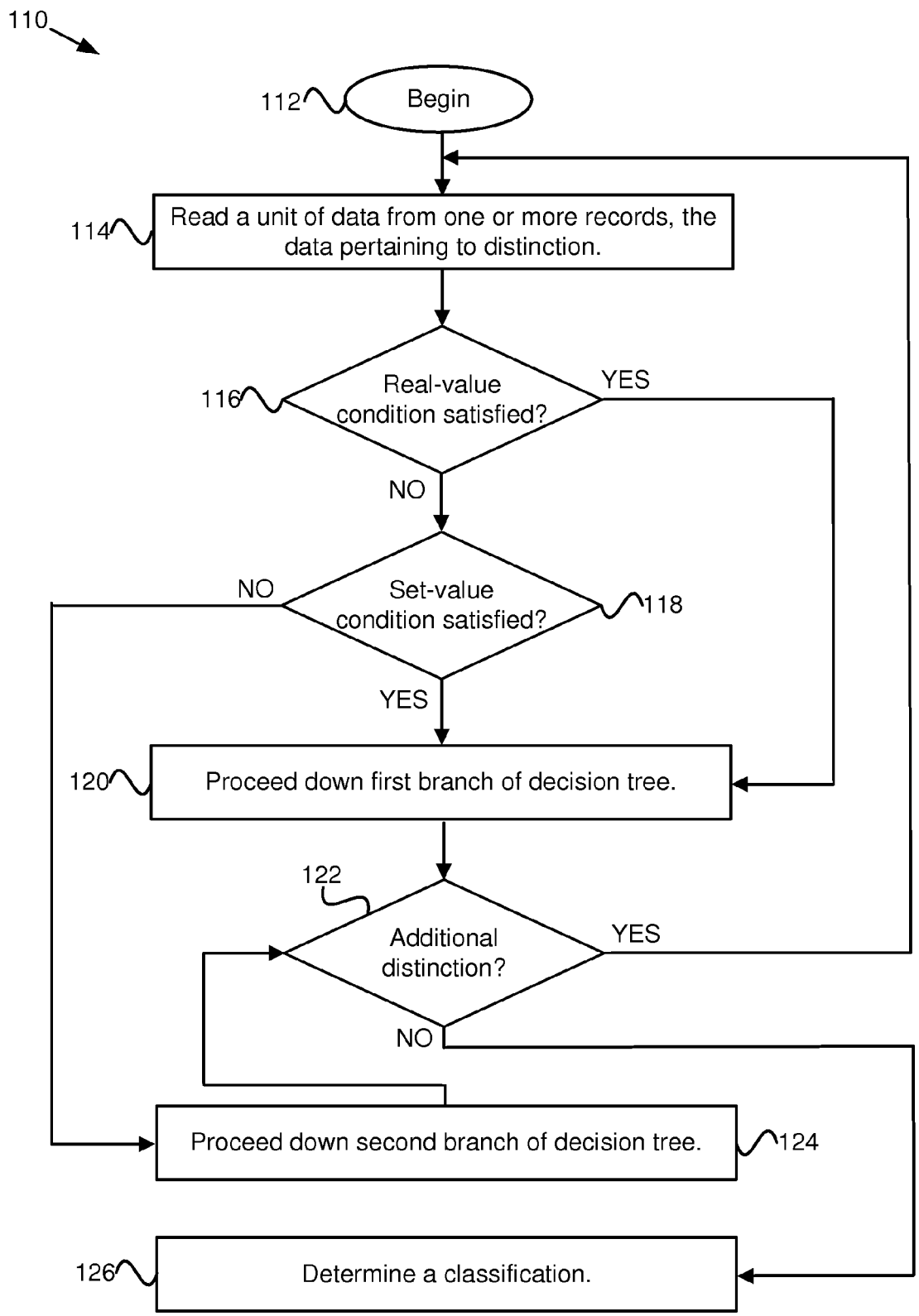
FIG. 9 is a schematic block diagram of details of an additional method for making real-value comparisons and making set-value determinations in a decision tree to classify a record in accordance with the present invention.

Referring to FIG. 9, an additional method, or process, 110 is depicted for making real-value comparisons 54 and making set-value determinations 56 to classify records 28 with the aid of a decision tree 26. Although the process 110 may be proceeded by additional steps involved in several embodiments, such as those discussed above, with respect to the portion of the process 110 described in FIG. 9, the process may begin 112 with the reading 114 of a unit of data 52 from one or more records 28 pertaining to a distinction 58 at a node 30 in the decision tree 26b. A real value, Xr, corresponding to the unit(s) of data 52 may be compared to a real-value condition at a node 30 in the decision tree 26b to determine 116 if the real-value condition is satisfied.

Where a determination 116 is made that the real-value condition is satisfied, the process 112 may proceed down a first branch 32a of the decision tree 26a. Where a determination 116 is made that the real-value condition is not satisfied, the process 112 may proceed to a determination 118 as to whether a set-value, Xs, corresponding to the unit(s) of data 52 satisfies a set-value condition at the same node 30 of the decision tree 26a. Where a second determination 118 is made that the set-value condition is satisfied, the process 110 may also proceed down the first branch 32a of the decision tree. Where the second determination 118 is made that the set-value condition is not satisfied, the process 110 may proceed 124 down the second branch 32b of the decision tree. The process may proceed from either the first branch 32a, or the second branch 32b to a determination 122 as to whether there is an additional distinction 58 in the decision tree 26a. Where the answer is yes, the process may return to reading 114 a unit of data 52 that corresponds to this new distinction 58, and the process may repeat as before. Where the determination 122 is made that there is not an additional distinction 58, a leaf 34 of the tree may provide a probability distribution for a target feature/attribute. This probability distribution, and/or other information in a decision-tree leaf 34 may be used to determine 126 a classification for the record 28.

As may be seen, the particular embodiment illustrated in FIG. 9 is based on an "OR" logic with respect the real-value and set-value conditions. Other arrangements may be included within the scope of the present invention. For example, selected embodiments in accordance with the present invention may be based on "AND" logic with respect the real-value and set-value conditions. In such embodiments, satisfaction of both the real-value condition and the set-value condition may lead to the first branch, while dissatisfaction of one or both of the real-value and set-value conditions may lead to the second branch.

The flowchart in FIGS. 8 and 9 illustrates the architecture, functionality, and operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A decision-tree system comprising:
one or more processing modules; and
one or more non-transitory storage modules storing computing instructions configured to run on the one or more processing modules and perform acts of:
storing structured data comprising a decision tree in a data store;
storing a record to be analyzed according to the decision tree in an additional data store;
storing one or more training records in a training data store;
selecting, by a distinction module, between multiple paths extending from a node in the decision tree based at least in part on a unit of data from the record, the unit of data from the record carrying information relevant to a distinction of the node, the distinction module further comprising:
a real-value module operable to make a first comparison between the unit of data from the record and a predetermined real value for the distinction of the node; and
a set-value module operable to make a second comparison between the unit of data from the record and a predetermined set value for the distinction of the node, the set-value module is operable to make the second comparison by determining whether the unit of data from the record comprises an element of a set, the set defined by the predetermined set value for the distinction of the node, and the predetermined set value for the distinction of the node defines the set that comprises a unit of data with missing data;
the distinction module further operable to select a path from the multiple paths based at least in part on at least one of:
the first comparison; or
the second comparison;
accounting, by a training module operable to train the decision tree, for a known path of one of the one or more training records from the multiple paths extending from the node by both:
a first relationship between a unit of training data from the one of the one or more training records and the predetermined real value for the distinction of the node; and
a second relationship between the unit of training data and the predetermined set value for the distinction of the node;
generating, by the training module, the decision tree in the data store as a probability estimation tree (PET) from the one or more training records by a machine learning algorithm; and
using, by the machine learning algorithm, the missing data to:
determine one or more nodes of the decision tree; or set the predetermined real value for the distinction of the node.

2. The system of claim 1, wherein:
the one or more non-transitory storage modules storing the computing instructions configured to run on the one or more processing modules and further perform the acts of:
storing a comparison record in at least one of:
the data store;
the additional data store; or
another data store; and
providing, by a comparison module, the distinction module with a unit of comparison data from the comparison record, the unit of comparison data carrying information relevant to the distinction of the node; and
wherein:
the real-value module is operable to determine if a variance between a real value of the unit of data from the record and a comparison real value of the unit of comparison data from the comparison record is within a tolerance set by the predetermined real value for the distinction of the node.

3. The system of claim 2, wherein the training module generates the decision tree to determine a target feature, the target feature being whether two records are linked by pertaining to a common individual or household.

4. The system of claim 1, wherein the predetermined set value defines a set that comprises a unit of data for which a request to provide data for the unit of data has been declined.

5. The system of claim 1, wherein:
the one or more non-transitory storage modules storing the computing instructions are configured to run on the one or more processing modules and further perform the acts of:
storing a comparison record in at least one of:
the data store;
the additional data store; or
another data store; and
providing, by a comparison module, the distinction module with a unit of comparison data from the comparison record, the unit of comparison data carrying information relevant to the distinction of the node;
the real-value module is operable to determine if a variance between a real value of the unit of data from the record and a comparison real value of the unit of comparison data from the comparison record is within a tolerance set by the predetermined real value for the distinction of the node;
the training module generates the decision tree to determine a target feature, the target feature being whether two records are linked by pertaining to a common individual or household; and
the predetermined set value defines a set that comprises a unit of data for which a request to provide data for the unit of data has been declined.

6. The system of claim 1, wherein:
the PET comprises:
the node with different combinations of real values and set values from the one or more training records relative to the predetermined real value for the distinction of the node and the predetermined set value for the distinction of the node assigned by the training module to different paths extending from the node according to known paths of corresponding training records; and a leaf at a terminal end of the PET comprising a conditional probability distribution generated by the training module for a target feature, the conditional probability distribution informed by both real values and set values relative to the predetermined real value for the distinction of the node and the predetermined set value for the distinction of the node respectively.

7. A decision-tree system comprising:
one or more processing modules; and
one or more non-transitory storage modules storing computing instructions configured to run on the one or more processing modules and perform acts of:
 storing a decision tree within a data store;
 storing multiple records within the data store, at least a portion of the multiple training records are known to be linked to another record within the multiple training records;
 by a distinction module:
  extracting a first unit of data from a first record and a second unit of data from a second record with information allowing the distinction module to select from among multiple paths extending from a node of the decision tree in response to a distinction of the node; and
  selecting a path from the multiple paths based on a real value comparison and a determination with respect to set inclusion;
 comparing, by a real-value module, a first real value of the first unit of data and a second real value of the second unit of data;
 determining, by a set-value module, whether the first unit of data is a member of a set defined by a set value of the node;
 determining, by the set-value module, that the first unit of data is a member of a set where the first unit of data is missing data and to determine that the first unit of data is not a member of a set where the first unit of data is not missing data;
 by a training module:
  generating, by a machine learning algorithm, one or more nodes of the decision tree with corresponding distinctions, a predetermined real value for the distinction of the node and set values, and one or more leaves with conditional probability distributions providing a probability estimate as to whether a record is linked to another record; and
  assigning paths for various combinations of a relationship between real values of two records and the predetermined real value for the distinction of the node and a determination as to whether a unit of data is a member of the set defined by the set value of the node to create the one or more leaves with the conditional probability distributions providing a probability estimate as to whether a record is linked to another record; and
 using, by the machine learning algorithm, the missing data to:
  determine the one or more nodes of the decision tree; or
  set the predetermined real value for the distinction of the node.

8. The system of claim 7, wherein:
the one or more non-transitory storage modules storing computing instructions are configured to run on the one or more processing modules and further perform the acts of:
 determining, by a reading module, that the first record and the second record are linked where a largest probability from a conditional probability distribution in a leaf of the decision tree selected by the distinction module is a probability that the first record and the second record are linked.

9. The system of claim 7, wherein the real-value module compares a variance between two strings to the predetermined real value for the distinction of the node.

10. The system of claim 7, wherein:
the one or more non-transitory storage modules storing the computing instructions configured to run on the one or more processing modules and further perform the acts of:
 determining, by a reading module, that the first record and the second record are linked where a largest probability from a conditional probability distribution in a leaf of the decision tree selected by the distinction module is a probability that the first record and the second record are linked; and
the real-value module compares a variance between two strings to the predetermined real value for the distinction of the node.

11. A method comprising:
storing structured data comprising a decision tree in a data store;
storing a record to be analyzed according to the decision tree in an additional data store;
storing one or more training records in a training data store;
selecting between multiple paths extending from a node in the decision tree based at least in part on a unit of data from the record, the unit of data from the record carrying information relevant to a distinction of the node, at least in part by:
 making a first comparison between the unit of data from the record and a predetermined real value for the distinction of the node; and
 making a second comparison between the unit of data from the record and a predetermined set value for the distinction of the node by determining whether the unit of data from the record comprises an element of a set, the set defined by the predetermined set value for the distinction of the node, and the predetermined set value for the distinction of the node defines the set that comprises a unit of data with missing data;
selecting a path from the multiple paths based at least in part on at least one of:
 the first comparison; or
 the second comparison;
accounting for a known path of one of the one or more training records from the multiple paths extending from the node by both:
 a first relationship between a unit of training data from the one of the one or more training records and the predetermined real value for the distinction of the node; and
 a second relationship between the unit of training data and the predetermined set value for the distinction of the node;
generating the decision tree in the data store as a probability estimation tree (PET) from the one or more training records by a machine learning algorithm; and using the missing data to:
  determine one or more nodes of the decision tree; or
  set the predetermined real value for the distinction of the node.

12. The method of claim 11, further comprising:
storing a comparison record in at least one of:
  the data store;
  the additional data store; or
  another data store; and
providing a unit of comparison data from the comparison record, the unit of comparison data carrying information relevant to the distinction of the node; and
determining if a variance between a real value of the unit of data from the record and a comparison real value of the unit of comparison data from the comparison record is within a tolerance set by the predetermined real value for the distinction of the node.

13. The method of claim 12, further comprising:
generating the decision tree to determine a target feature, the target feature being whether two records are linked by pertaining to a common individual or household.

14. The method of claim 11, wherein:
the predetermined set value defines a set that comprises a unit of data for which a request to provide data for the unit of data has been declined.

15. The method of claim 11, further comprising:
storing a comparison record in at least one of:
  the data store;
  the additional data store; or
  another data store; and
providing a unit of comparison data from the comparison record, the unit of comparison data carrying information relevant to the distinction of the node;
determining if a variance between a real value of the unit of data from the record and a comparison real value of the unit of comparison data from the comparison record is within a tolerance set by the predetermined real value for the distinction of the node; and
generating the decision tree to determine a target feature, the target feature being whether two records are linked by pertaining to a common individual or household; and
wherein:
  the predetermined set value defines a set that comprises a unit of data for which a request to provide data for the unit of data has been declined.

16. The method of claim 11, wherein:
the PET comprises:
  the node with different combinations of real values and set values from the one or more training records relative to the predetermined real value for the distinction of the node and the predetermined set value for the distinction of the node assigned by a training module to different paths extending from the node according to known paths of corresponding training records; and
  a leaf at a terminal end of the PET comprising a conditional probability distribution for a target feature, the conditional probability distribution informed by both real values and set values relative to the predetermined real value for the distinction of the node and the predetermined set value for the distinction of the node respectively.

* * * * *